(12) United States Patent
Feuerecker et al.

(10) Patent No.: US 9,707,823 B2
(45) Date of Patent: Jul. 18, 2017

(54) COOLING SYSTEM FOR A MOTOR VEHICLE

(75) Inventors: Günther Feuerecker, Stuttgart (DE); Karl Lochmahr, Vaihingen/Enz (DE); Frank Müller, Simmozheim (DE); Dirk Neumeister, Stuttgart (DE); Thomas Strauβ, Notzingen (DE); Marcus Weinbrenner, Gerlingen (DE); Richard Obradovich, Livonia, MI (US); Gunnar Schlinke, Troy, MI (US); Christophe Schmittheisler, Epfig (FR)

(73) Assignee: MAHLE International GmbH, Stuttgart (DE)

( * ) Notice: Subject to any disclaimer, the term of this patent is extended or adjusted under 35 U.S.C. 154(b) by 2029 days.

(21) Appl. No.: 12/035,648

(22) Filed: Feb. 22, 2008

(65) Prior Publication Data
US 2008/0223064 A1   Sep. 18, 2008

(30) Foreign Application Priority Data
Feb. 23, 2007 (EP) .................................... 07290242

(51) Int. Cl.
*F25B 13/00* (2006.01)
*B60H 1/32* (2006.01)
*B60H 1/00* (2006.01)

(52) U.S. Cl.
CPC .............. *B60H 1/00921* (2013.01); *B60H 2001/00928* (2013.01); *B60H 2001/00949* (2013.01)

(58) Field of Classification Search
CPC ...... B60H 1/00921; B60H 2001/00928; B60H 2001/00949
USPC .................................. 62/324.2, 323.2, 324.1
See application file for complete search history.

(56) References Cited

U.S. PATENT DOCUMENTS

| | | | | |
|---|---|---|---|---|
| 6,237,357 B1* | 5/2001 | Hirao et al. | | 62/325 |
| 6,332,497 B1* | 12/2001 | Niwa et al. | | 165/204 |
| 6,386,279 B1* | 5/2002 | Okabe et al. | | 165/202 |
| 6,467,286 B2* | 10/2002 | Hasebe et al. | | 62/185 |
| 6,616,059 B2* | 9/2003 | Sabhapathy et al. | | 237/12.3 B |
| 6,640,889 B1* | 11/2003 | Harte et al. | | 165/202 |
| 7,147,038 B2* | 12/2006 | Taguchi | | 165/41 |
| 2004/0035130 A1* | 2/2004 | Amaral et al. | | 62/323.1 |

(Continued)

FOREIGN PATENT DOCUMENTS

| | | |
|---|---|---|
| DE | 39 07 201 A1 | 9/1990 |
| DE | 102 25 055 A1 | 12/2003 |

*Primary Examiner* — Allen Flanigan
*Assistant Examiner* — Filip Zec
(74) *Attorney, Agent, or Firm* — Muncy, Geissler, Olds & Lowe, P.C.

(57) ABSTRACT

The disclosed air-conditioning system for a vehicle driven by a motor, has a refrigerant circuit with a plurality of heat exchangers through which a refrigerant can be conducted for an exchange of heat with the air which flows through them, and has a heat pump heat exchanger in which an exchange of heat with a coolant circuit, in which at least one coolant cooler is arranged, takes place. It is possible for the coolant cooler, in the heating mode, to be used as a heat exchanger for absorbing heat from the environment. It is possible for the coolant cooler to be connected in series downstream of the heat pump heat exchanger in the coolant circuit A method for regulating such an air-conditioning system is also disclosed.

15 Claims, 4 Drawing Sheets

(56) References Cited

U.S. PATENT DOCUMENTS

Figure 1:
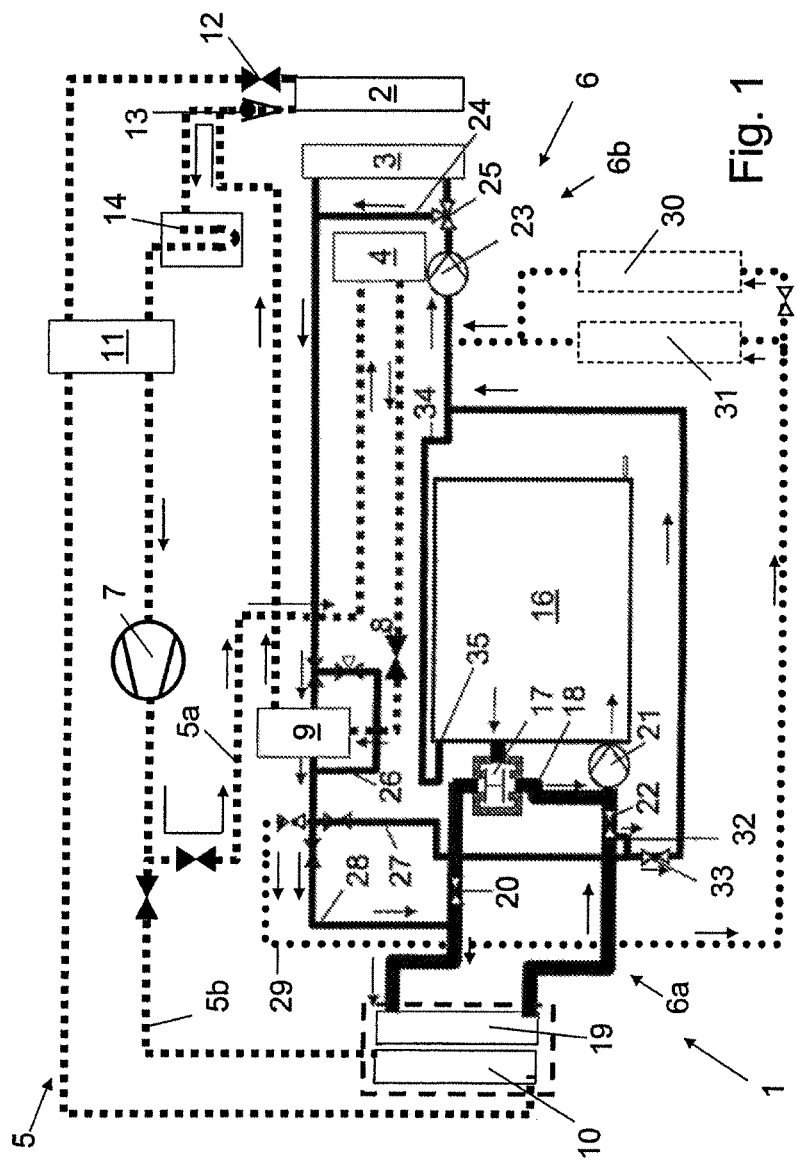

2004/0050086 A1  3/2004  Amaral et al.
2004/0089003 A1  5/2004  Amaral et al.
2005/0224221 A1  10/2005  Feuerecker et al.

* cited by examiner

COOLING SYSTEM FOR A MOTOR VEHICLE

The invention relates to an air-conditioning system for a vehicle.

In order to reduce the energy consumption of vehicles, in particular of motor vehicles, and to save energy, heat pump systems are used in air-conditioning systems of low-consumption vehicles. Many heat pumps utilize the ambient air as a heat source. Since ambient heat is utilized here for heating, such systems can have an advantageous level of energy consumption.

Many of said heat pumps additionally utilize the evaporator, which cools the cabin supply air in the cooling mode, as a heater, which heats the cabin supply air in the heating mode. This however has the disadvantage that condensation water is precipitated at the evaporator/heater during cooling and dehumidifying. If said moist evaporator is used for heating, fogging of the plates occurs (flash fogging) which must imperatively be avoided for safety reasons. Such a configuration, in which heating and cooling take place in close succession in terms of time, often occurs in the climatic transitional period in spring and autumn. This is reliably remedied without restrictions by the addition of a further heat exchanger in the supply air flow, which is used only for heating, while the evaporator is used only for cooling and dehumidifying, as is described for example in DE 39 07 201.

DE 102 25 055 A1 discloses an air-conditioning system for a motor vehicle, having a refrigerant circuit with a plurality of heat exchangers through which a refrigerant can be conducted, and having a coolant circuit, with one heat exchanger serving for the exchange of heat between the refrigerant and coolant. Here, two heaters are provided in the heating mode; one is part of the refrigerant circuit, the other is part of the coolant circuit, with the heater of the coolant circuit being arranged between the heat exchangers of the refrigerant circuit. Individual regions of the refrigerant circuit are not traversed by flow under certain operating conditions. However, said system is reliant on a powerful heat source being available for heating the motor coolant, as is the case in conventional internal combustion engines which are operated with a gasoline, diesel or gas engine. In the case of a (predominantly) battery-operated vehicle, however, a sufficient heat source for the heat pump is not usually available. The same applies to fuel cell vehicles in which there is likewise no heat for a heat pump available in the first minutes.

It is an object of the invention to provide an improved air-conditioning system.

Said object is achieved by means of an air-conditioning system having the features of claim 1. Advantageous embodiments are the subject matter of the subclaims.

According to the invention, an air-conditioning system for a vehicle driven by a motor is provided with a refrigerant circuit with a plurality of heat exchangers through which a refrigerant can be conducted for an exchange of heat with the air which flows through them, and having a heat pump heat exchanger in which an exchange of heat with a coolant circuit, in which at least one coolant cooler is arranged, takes place, with it being possible for the coolant cooler, in the heating mode, to be used as a heat exchanger for absorbing heat from the environment, and with the coolant cooler being connected in series downstream of the heat pump heat exchanger in the coolant circuit. A construction of said type permits the utilization of different heat sources, in particular the utilization of air (ambient air) when the motor is at a standstill, and coolant when the motor is running and has a sufficient temperature.

It is preferably possible for at least one further heat exchanger to be connected in parallel to the coolant cooler which serves for absorbing heat, which further heat exchanger makes it possible to utilize the heat of further heat sources. Said further heat exchanger is preferably a heat exchanger which is arranged in the waste air flow (cabin waste air) passing from the vehicle interior space, or a heat exchanger which is arranged in the region of a battery or heat-generating power electronics. This permits a relatively simple utilization of heat sources which would otherwise dissipate their heat to the environment. By utilizing said heat, it is possible to save energy, as a result of which the heat pump power can be increased and icing of the coolant cooler can additionally be reduced.

The motor can preferably be at least partially bypassed by coolant via a bypass. This takes place in particular when no waste heat of the internal combustion engine or of a fuel cell is available and the vehicle is driven only by means of an electric motor. The temperature of the motor is then too low for heat to be absorbed from it, such that if said motor were traversed by flow, the coolant would dissipate heat to the motor.

The coolant cooler is preferably arranged adjacent to the refrigerant cooler, and the two coolers are particularly preferably integrated in one component, and means are provided for interrupting the air flow through the two coolers.

In a heating mode without utilizing the waste heat of the motor, the coolant, which firstly dissipates heat to the coolant in the heat pump heat exchanger and subsequently flows through the coolant cooler in which it absorbs heat from the environment, is preferably supplied again to the heat pump heat exchanger while bypassing the motor. It can thus be ensured that no undesired heat loss takes place in the motor, in particular when the motor is cold.

In a heating mode without the motor running and without utilizing the waste heat of the motor, the coolant is conducted past the motor and/or past the heating body via bypasses, so that all of the heat absorbed via (other) heat sources remains in the coolant and can be dissipated to the heat pump heat exchanger.

It is preferable that, in a heating mode, the heating body is bypassed by means of a bypass until the coolant temperature at the heating body inlet is at least 5K higher than the ambient temperature. This ensures that there are no repercussions on the heat pump circuit which result in the suction pressure falling to too great a degree.

It is preferable that, in a heating mode without the internal combustion engine running, elements of the coolant circuit which have a lower thermal mass—aside from the heat pump heat exchanger—are bypassed via bypasses, so that no unnecessary heat loss occurs.

In a heating mode without utilizing the waste heat of the motor, the coolant is preferably additionally conducted in parallel branches, in a regulable manner by means of valves, through one, two or more different heat exchangers in which heat can be absorbed. Said heat exchangers can for example be the cooler, a cabin air heat exchanger or a battery heat exchanger.

In the event of the cooler becoming iced up, wherein the ambient heat can no longer be utilized, the internal combustion engine is preferably started, the waste heat of which internal combustion engine can be utilized by means of the heat pump. A flow of warm motor coolant through the cooler also preferably takes place in order to de-ice said cooler once the temperature of the motor cooler has reached a sufficient temperature. In addition, the air flow through the refrigerant gas cooler and through the adjacent coolant cooler is preferably interrupted in order to minimize the heat required for de-icing.

Overall, the improved utilization of heat results in a reduction in the number of activation and deactivation processes of the motor, as a result of which the service life is increased.

Figure 2:
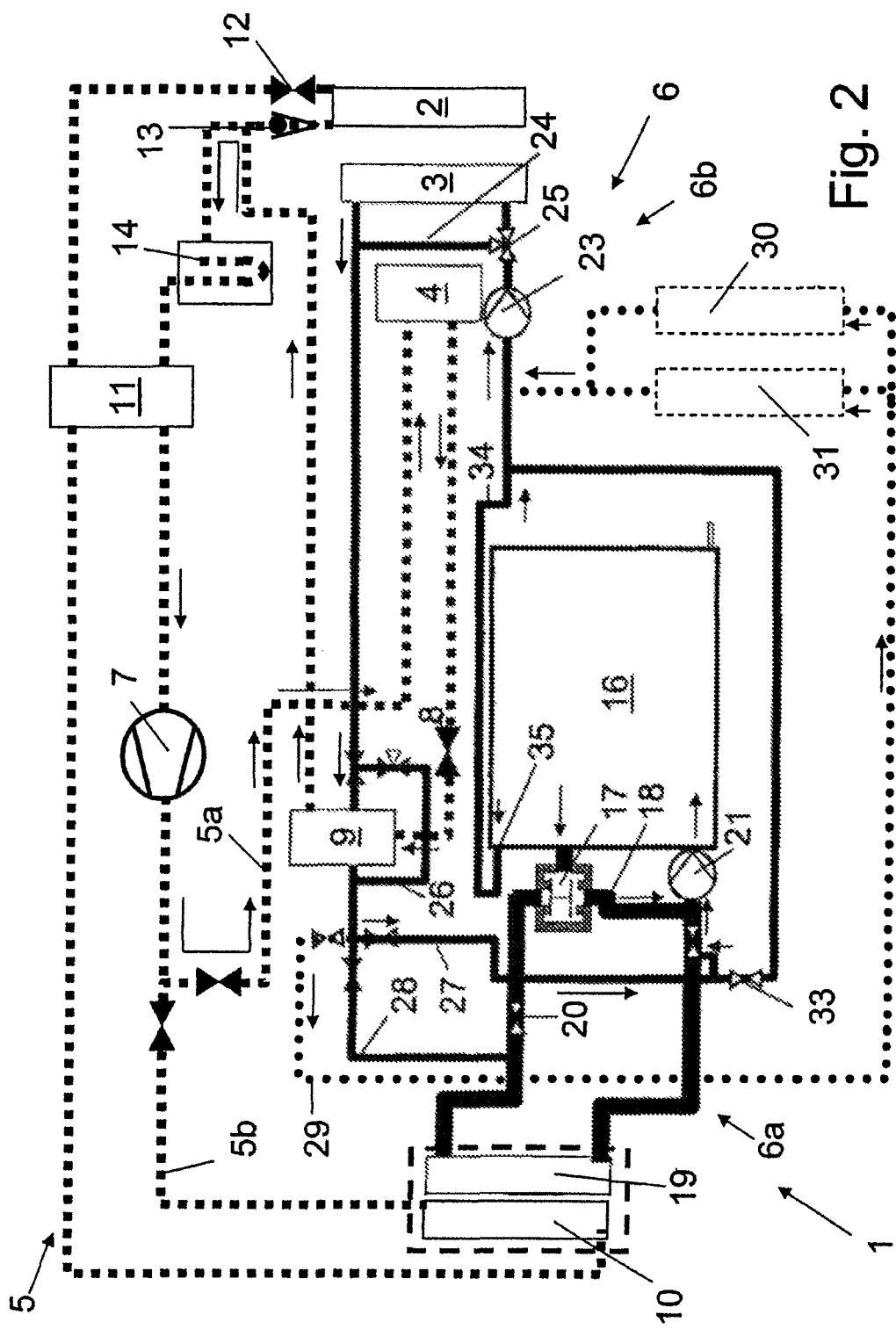
Figure 3:
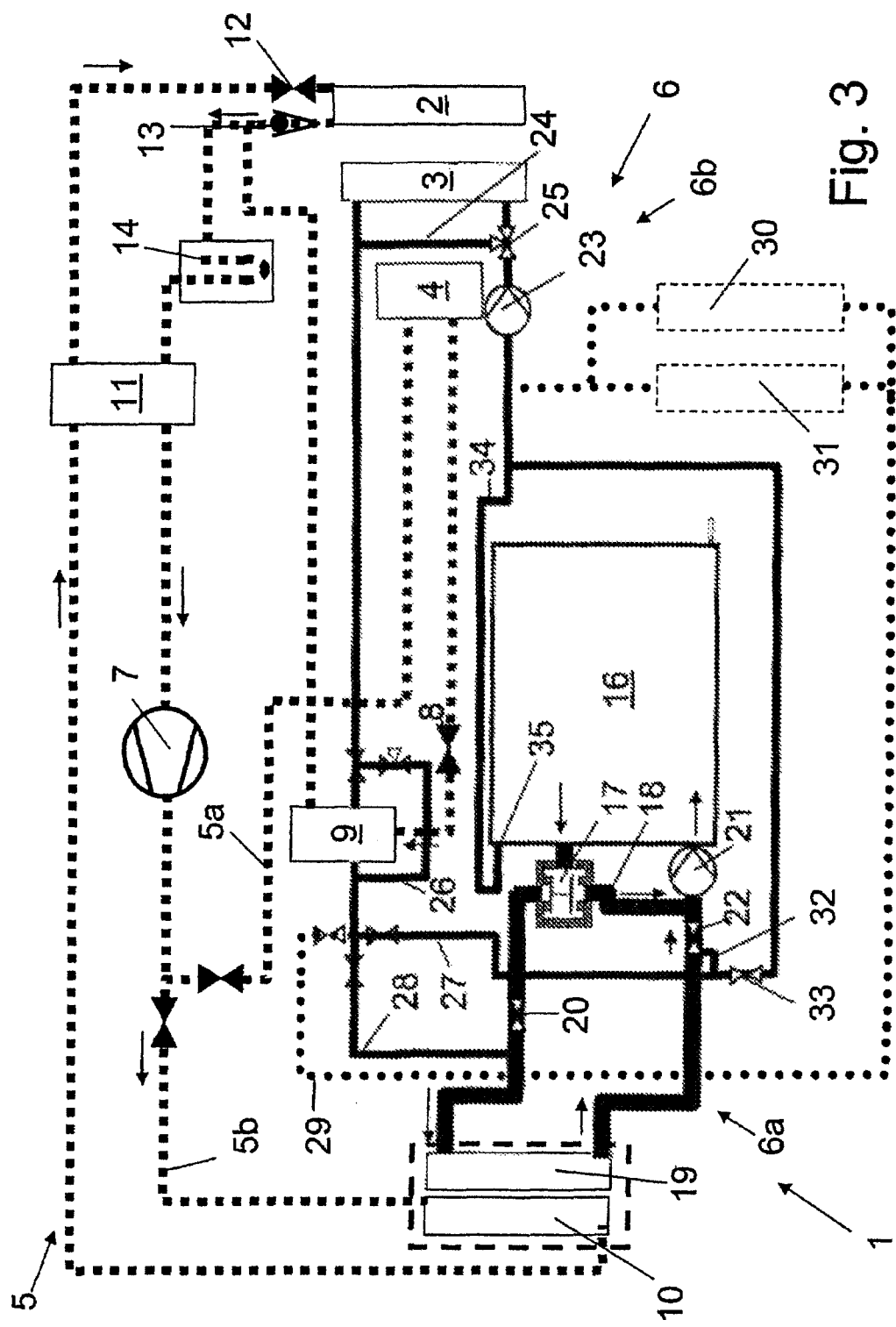
Figure 4:
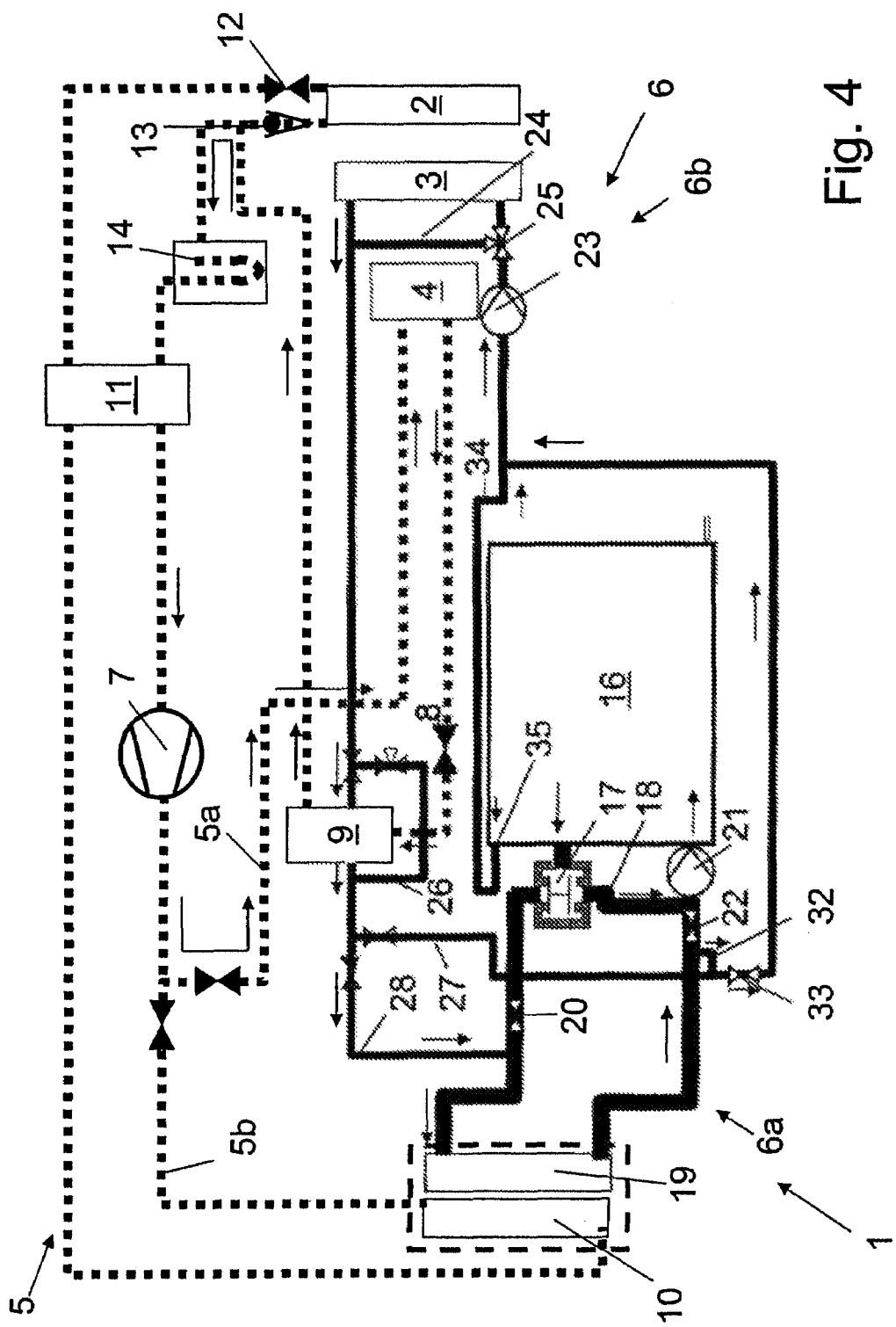

The invention is explained in more detail below on the basis of two exemplary embodiments and with reference to the drawing, in which:

FIG. 1 is a schematic illustration of the coolant and refrigerant circuits of an air-conditioning system as per the first exemplary embodiment in the heating mode without utilizing the waste heat of the internal combustion engine and utilizing the heat of the cabin waste air, FIG. 2 shows the coolant and refrigerant circuits from FIG. 1 in a heating mode utilizing the waste heat of the internal combustion engine and the heat of the cabin waste air, FIG. 3 shows the coolant and refrigerant circuits from FIG. 1 in the cooling mode, and FIG. 4 is a schematic illustration of the coolant and refrigerant circuits of an air-conditioning system as per the second exemplary embodiment in the heating mode utilizing the waste heat of the internal combustion engine.

A motor vehicle air-conditioning system 1 has, for the temperature control of the vehicle interior space, an evaporator 2, a heating body 3 and a heater 4 which can be traversed by the air which is to be supplied to the vehicle interior space. Here, firstly the evaporator 2 and—depending on the position of a mixing flap (not illustrated—the heating body 3 and the heater 4 are traversed by air. In the heating mode illustrated in FIG. 1, both the heating body 3 and also the heater 4 are traversed by air which is to be heated.

The evaporator 2 and the heater 4 are part of a refrigerant circuit 5 which is illustrated in the drawing by square-dotted lines. The heating body 3 is part of a coolant circuit 6 which is illustrated by solid lines and, in a partial region, by round-dotted lines for better clarity.

Provided in the refrigerant circuit 5, which is circulated by a refrigerant compressor 7, are two branches 5a and 5b, with the refrigerant distribution between the two branches 5a and 5b taking place by means of two valves which are arranged downstream of the refrigerant compressor 7. Arranged in the first refrigerant branch 5a are said heater 4, an expansion element 8 and a heat pump evaporator 9. Arranged in the second refrigerant branch 5b are a refrigerant gas cooler 10, an inner heat exchanger 11 a second expansion element 12, said evaporator 2 for cooling the air which is to be supplied to the vehicle interior space, and a non-return valve 13. Arranged downstream of the merging of the two branches 5a and 5b is an accumulator 14 and the inner heat exchanger 11 which, on this side, is traversed by flow in the opposite direction.

The coolant circuit 6 has two significant branches. One of the branches is the branch which is illustrated in the drawing by thick lines and is referred to below as the cooler branch 6a and which serves for the direct cooling of the coolant passing from the motor 16, with a valve 17 being provided, by means of which a part of the coolant can be conducted past the cooler 19 via a bypass 18 while the rest of the coolant flows through the cooler 19, which is traversed by ambient air for an exchange of heat. The coolant is circulated by means of a coolant pump 21, with a further valve 22 being arranged upstream of the coolant pump 21. Together with a valve 20, which is preferably embodied as a non-return valve, said further valve 22 serves to set the proportion of coolant which flows through the motor in the heat pump mode. This is described in more detail at a corresponding point.

The second branch of the coolant circuit 6, also referred to below as the heat pump branch 6b, serves for additional energy reclamation, with it being possible for said heat pump branch 6b to also be operated independently of the cooler branch 6a. Proceeding from the second coolant pump 23, the coolant flows through the heating body 3, which serves for heating the air which is to be supplied to the vehicle interior space, or flows past said heating body 3 via a bypass 24, with the regulation taking place by means of a valve 25 arranged at the branch. After flowing through the heating body 3 or the bypass 24, the coolant passes to the heat pump evaporator 9 of the refrigerant circuit 5, which can also be bypassed via a bypass 26 in a manner regulated by means of valves.

At a further branching point, the line branches into three continuing lines 27, 28, 29, with the line 29 illustrated by a round-dotted line, which leads to a battery heat exchanger 30 and a cabin waste air heat exchanger 31 which are connected in parallel, with it being possible for the battery heat exchanger 30 to be blocked by means of an additional valve, and which subsequently opens out into the circuit again upstream of the second coolant pump 23, being optional and being dispensed with entirely according to the second exemplary embodiment (see FIG. 3). The lines 27, 28, 29 are, according to the present illustration, regulated by means of individual valves, though it is also possible for a common four-way valve, which assumes the function of the three valves, to be provided at the branching point.

The line 27 has a connecting line 32 which opens out into the cooler branch 6a a short distance upstream of the first coolant pump 21 upstream of the valve 22. A valve 33 for regulating the coolant flow is provided in the line 27 downstream of the branch of the connecting line 32. The line 27 opens out—adjacent to the optional line 29—upstream of the second coolant pump 23 into a line 34 of the coolant circuit 6. The line 28 leads directly to the cooler branch 6a and opens out into the latter downstream of the valve 19 and upstream of the cooler 20.

A second outlet 35 for coolant out of the motor 16 is also provided, which second outlet 35 is connected to the line 34 into which the line 27, which serves to bypass the motor 16, opens out and which leads to the second coolant pump 23.

The function of the air-conditioning system 1 according to the first exemplary embodiment, that is to say comprising the line 29 illustrated by a round-dotted line in the drawing, is explained in more detail below on the basis of various operating states.

FIG. 1 shows the heating mode of the air-conditioning system 1 without utilizing the waste heat of the internal combustion engine 16 but utilizing the heat of the cabin waste air, battery and other power electronics.

Here, the refrigerant circuit 5 is used as a heat pump, with the refrigerant compressor 7 circulating the refrigerant through the open valve of the first refrigerant branch to the heater 4, to the first expansion element 8, to the heat pump evaporator 9, to the accumulator 14, to the inner heat exchanger 11 and to the refrigerant compressor 7 again. Here, the valve of the second refrigerant branch 5b is closed, so that no refrigerant flows through the refrigerant gas cooler 10 and through the evaporator 2. In the heat pump evaporator 9, the expanded and therefore cold refrigerant absorbs heat from the coolant, which in the present case flows through the heat pump evaporator 9 in the opposite direction.

In the heating mode illustrated in FIG. 1, the coolant is conducted from the motor 16 via a bypass 18 and the first coolant pump 21 and into the motor 16 again, that is to say no utilization of motor waste heat takes place. The first coolant pump 21 is preferably not operated at all. The coolant flow is conducted via the bypass 24 past the heating body 3 and passes to the heat pump evaporator 9 in which it dissipates heat to the refrigerant. The cold coolant is distributed between the lines 28 and 29 as a result of the valve positions of the corresponding valves. The line 27 is not traversed by flow in this region. The coolant which passes into the line 28 flows through the cooler 19 and absorbs heat from the environment before being supplied to the line 27 and to the line 34 again via the connecting line 32 as a result of the closed valve 22. The coolant which passes into the line 29 flows through the cabin waste air heat exchanger 31 or—if the battery is sufficiently warm and therefore the valve arranged upstream of the heat exchanger is open—alternatively through the battery heat exchanger 30, with the coolant flow being split up upstream of the heat exchangers 30 and 31. The heated coolant is subsequently admixed to the coolant flowing through the line 34. As a result of the cabin waste air and the battery/power electronics being available as additional heat sources for the coolant circuit 6, the heat absorption from the environment is minimized, so that frosting/icing of the coolant cooler 19 is additionally slowed.

Said operating mode is utilized in particular in a fresh-air mode in which warm waste air from the cabin is available but, as a result of the motor being at a standstill for a relatively long period of time, for example on account of battery-powered operation, no motor waste heat or insufficient motor waste heat is available.

FIG. 2 shows a heating mode utilizing waste heat of the motor and—as described above—utilizing the heat of the cabin waste air, battery and other power electronics. Said mode is advantageous when the internal combustion engine is running and the operating conditions, in particular coolant and oil temperature, are advantageous for said conditions. It is also possible to indicate when the coolant cooler is iced up and can no longer provide sufficient ambient heat for the heat pump. The internal combustion engine then delivers the heat for the heat pump.

The operation of the refrigerant circuit 5 does not differ from that described above, and therefore this is not described in any more detail. In order to heat the cold refrigerant in the heat pump evaporator 9, the latter is provided with warm coolant in that coolant from the motor 16 passes via the second outlet 35 of the motor 16 coolant via the second coolant pump 23—via the bypass 24 or via the heating body 3 depending on the temperature of the coolant—to the heat pump evaporator 9. From there, the coolant is distributed between the two lines 27 and 29, with said coolant being supplied via the line 27 and the connecting line 32 to the motor 16 again, and, via the line 29, bypassing the motor 16 and flowing through the cabin waste air heat exchanger 31 or—if the battery is sufficiently warm and therefore the valve arranged upstream of the heat exchanger is open—in the manner of a parallel circuit arrangement through the battery heat exchanger 30, and subsequently being admixed again to the coolant passing from the motor 16 flowing through the line 34.

The regulation of the coolant flow via the heating body 3 and/or via the bypass 24 takes place as a function of the available heat. Here, the heating body 3 is bypassed via the bypass 24 if the coolant temperature at the heating body inlet is not at least 5K above the ambient temperature, and has no adverse effect on the power of the refrigerant circuit 5 (that is to say, in the present case, the suction pressure in the refrigerant circuit does not fall to a level below 15 bar).

The heat pump heat exchanger 9 is bypassed at the coolant side only in the pure heating body heating mode. In contrast, in a heating mode without the motor 16 running, for example the heating body 3 or the motor 16 are bypassed via bypasses if a lower temperature than that of the coolant prevails in said components, so that said components do not serve as heat sinks on account of their mass.

By clocking the valves 22 and 23 and therefore switching between the operating states described in FIGS. 1 and 2, it is also possible to continuously adjust the utilization of the motor heat within certain limits, which is particularly advantageous during the warm-running of the motor.

For completeness, FIG. 3 illustrates a cooling mode, with the waste heat generated by the motor 16 additionally being dissipated via the cooler 19 to the environment. The remaining region of the coolant circuit 6 is not active in this mode. In the refrigerant circuit 5, the second branch 5b is traversed by the refrigerant, while the first branch 5a is blocked by the corresponding valve 5a. The refrigerant therefore passes from the refrigerant compressor 7 to the refrigerant gas cooler 10, in which said refrigerant is cooled by ambient air, to the inner heat exchanger 11, in which further cooling takes place, to the expansion element 12, in which the pressure is reduced and the refrigerant is thereby cooled further, to the evaporator 2, in which said refrigerant cools the air which is to be supplied to the vehicle interior space, via the non-return valve 13 to the collector 14, to the second part of the inner heat exchanger 11, in which said refrigerant absorbs heat from the first part of the inner heat exchanger 11, and to the refrigerant compressor 7 again.

FIG. 4 shows a mode corresponding to FIG. 1, but in which the additional heat source of the cabin waste air and of the battery/power electronics is not utilized. The functioning in said mode, as is also the case in other operating modes, corresponds to that of the first exemplary embodiment, but with the line 29 and the heat exchangers 30 and 31 being dispensed with and therefore not being available for introducing heat into the coolant, and therefore in order to avoid repetition, this is not discussed again in any more detail.

Although not described in any more detail above, the cooler 19 and the refrigerant gas cooler 10 can be integrated into a single component. Here, it is for example possible for one of the coolers to extend only over a part of the width, and the other cooler can be designed to be deeper in the corresponding region, so that the installation space can be fully utilized over the entire width.

It is also possible to provide an interruption of the flow of air through the cooler 19 and refrigerant gas cooler 10, for example in the manner of a louver which permits accelerated de-icing of the coolant cooler 19, in particular at low external temperatures. Here, it is possible for the motor 16 to be started in the event of icing of the coolant cooler 19 in order to permit an uninterrupted heating mode of the heat pump. After a sufficient coolant temperature is reached, the cooler 19 can be traversed by warm coolant and can therefore be efficiently de-iced. For this purpose, the throughflow of air is preferably interrupted.

The coolant-side arrangement of the heating body 3 and heat pump evaporator 9 can differ from the arrangement illustrated here depending on the requirements with regard to installation space and function. A parallel circuit arrangement of the heating body and heat pump evaporator is thus conceivable, or else a circuit in which the heat pump evaporator is arranged upstream of the heating body at the coolant side.

It is also possible for the refrigerant valve 22 to be arranged in the line 34 between the outlet 35 and the opening-out point of the line 27. Depending on the embodiment of the engine cooling circuit, other arrangements of valves can also be necessary in order to ensure functionality according to the invention.

It can also be advantageous to additionally use an electric heater for heating the coolant. This can be necessary if the internal combustion engine does not produce enough waste heat in the present load state, for example at idle or when traveling down a slope for a relatively long period when the battery is at the same time fully charged. The desired heating power can then be provided directly, and the waste heat of the internal combustion engine can additionally be increased by the increased load.

The invention claimed is:

1. An air-conditioning system for a vehicle driven by a motor, comprising:
   a refrigerant circuit configured to allow a flow of a refrigerant through at least a portion of the refrigerant circuit, wherein the refrigerant circuit comprises a first refrigerant branch and a second refrigerant branch, configured in parallel;
   a coolant circuit configured to allow a flow of a coolant through at least a portion of the coolant circuit;
   a coolant cooler configured to act as a heat exchanger between (a) the coolant in the coolant circuit and (b) ambient air;
   at least one valve that controls the flow of the refrigerant between the first refrigerant branch and the second refrigerant branch;
   a heat pump heat exchanger that is in both the coolant circuit and the first branch of the refrigerant circuit, wherein the heat pump heat exchanger is configured to act as a heat exchanger between (a) a portion of the refrigerant that is in the first branch of the refrigerant circuit and (b) the coolant in the coolant circuit;
   a refrigerant cooler that is in the second branch of the refrigerant circuit, wherein the refrigerant cooler is arranged adjacent to the coolant cooler and is configured to act as a heat exchanger between (a) a portion of the refrigerant that is in the second branch of the refrigerant circuit and (b) ambient air; and
   a heater that is in the first refrigerant branch, wherein the heater is configured to heat air provided to a vehicle interior space,
   wherein the coolant cooler is in the coolant circuit and is connected in series downstream of the heat pump heat exchanger.

2. The air-conditioning system of claim 1, further comprising at least one additional heat exchanger connected in parallel to the coolant cooler, wherein the additional heat exchanger is configured to absorb heat from other heat sources.

3. The air-conditioning system of claim 1, wherein the coolant in the coolant circuit is configured to controllably bypass the motor via a bypass.

4. The air-conditioning system of claim 1, wherein the coolant cooler and the refrigerant cooler are integrated in one component.

5. The air-conditioning system of claim 1, wherein:
   the air-conditioning system is capable of being placed in either a heating mode or a cooling mode, and
   when the air-conditioning system is placed in the heating mode, the air-conditioning system is configured to conduct refrigerant through the first refrigerant branch, and when the air conditioning system is placed in the cooling mode, the air-conditioning system is configured to conduct refrigerant through the second refrigerant branch.

6. The air-conditioning system of claim 5, wherein, when the air conditioning system is placed in the heating mode, waste heat of the motor is configured to be controllably utilized to heat the coolant.

7. The air-conditioning system of claim 6, further comprising a heating body configured to heat air to be supplied to the vehicle interior space, wherein the heating body is in the coolant circuit.

8. A method for operating an air-conditioning system, the method comprising:
   using an air-conditioner system for a vehicle driven by a motor, comprising:
      a refrigerant circuit configured to allow a flow of a refrigerant through at least a portion of the refrigerant circuit, wherein the refrigerant circuit comprises a first refrigerant branch and a second refrigerant branch, configured in parallel;
      a coolant circuit configured to allow a flow of a coolant through at least a portion of the coolant circuit;
      a coolant cooler configured to act as a heat exchanger between (a) the coolant in the coolant circuit and (b) ambient air;
      at least one valve that controls the flow of the refrigerant between the first refrigerant branch and the second refrigerant branch;
      a heat pump heat exchanger that is in both the coolant circuit and the first branch of the refrigerant circuit, wherein the heat pump heat exchanger is configured to act as a heat exchanger between (a) a portion of the refrigerant that is in the first branch of the refrigerant circuit and (b) the coolant in the coolant circuit;
      a refrigerant cooler that is in the second branch of the refrigerant circuit, wherein the refrigerant cooler is arranged adjacent to the coolant cooler and is configured to act as a heat exchanger between (a) a portion of the refrigerant that is in the second branch of the refrigerant circuit and (b) ambient air; and
      a heater that is in the first refrigerant branch, wherein the heater is configured to heat air provided to a vehicle interior space,
      wherein the coolant cooler is in the coolant circuit and is connected in series downstream of the heat pump heat exchanger; and
   placing the air-conditioning system in a heating mode that does not utilize waste heat of the motor to heat the coolant,
   wherein, when the air conditioning system is placed in the heating mode, the waste heat of the motor is configured to be controllably utilized to heat the coolant, and
   wherein the coolant in the coolant circuit first dissipates heat to the coolant in the heat pump heat exchanger, then flows through the coolant cooler in which the coolant absorbs heat from the environment, and then is supplied to the heat pump heat exchanger.

9. The method of claim 8, wherein at least one element of the coolant circuit which has a lower temperature than the coolant in a corresponding region of the element is bypassed via at least one bypass.

10. The method of claim 8, wherein the coolant is controllably conducted through at least two parallel branches via valves, through at least two different heat exchangers.

11. The method of claim 8, further comprising placing the air-conditioning system in a cooling mode.

12. A method for operating an air-conditioning system, the method comprising:
 using an air-conditioner system for a vehicle driven by a motor, comprising:
  a refrigerant circuit configured to allow a flow of a refrigerant through at least a portion of the refrigerant circuit, wherein the refrigerant circuit comprises a first refrigerant branch and a second refrigerant branch, configured in parallel;
  a coolant circuit configured to allow a flow of a coolant through at least a portion of the coolant circuit;
  a coolant cooler configured to act as a heat exchanger between (a) the coolant in the coolant circuit and (b) ambient air;
  at least one valve that controls the flow of the refrigerant between the first refrigerant branch and the second refrigerant branch;
  a heat pump heat exchanger that is in both the coolant circuit and the first branch of the refrigerant circuit, wherein the heat pump heat exchanger is configured to act as a heat exchanger between (a) a portion of the refrigerant that is in the first branch of the refrigerant circuit and (b) the coolant in the coolant circuit;
  a refrigerant cooler that is in the second branch of the refrigerant circuit, wherein the refrigerant cooler is arranged adjacent to the coolant cooler and is configured to act as a heat exchanger between (a) a portion of the refrigerant that is in the second branch of the refrigerant circuit and (b) ambient air;
  a heater that is in the first refrigerant branch, wherein the heater is configured to heat air provided to a vehicle interior space; and
  a heating body configured to heat air to be supplied to the vehicle interior space, wherein the heating body is in the coolant circuit;
  wherein the coolant cooler is in the coolant circuit and is connected in series downstream of the heat pump heat exchanger; and
 placing the air-conditioning system in a heating mode that does not utilize waste heat of the motor to heat the coolant,
 wherein the coolant in the coolant circuit is conducted past the motor via a first bypass, and
 wherein the coolant in the coolant circuit is controllably conducted past the heating body via a second bypass.

13. The method of claim 12, wherein the coolant bypasses the heating body via the second bypass until a coolant temperature at an inlet of the heating body is at least 5K higher than an ambient temperature, at which point the coolant is conducted through the heating body.

14. The method of claim 12, further comprising placing the air-conditioning system in the heating mode that utilizes the waste heat of the motor, wherein the waste heat of the motor is used to heat the coolant in the coolant circuit.

15. The method of claim 14, wherein, in an event that the refrigerant cooler becomes iced up, a flow of ambient air through the refrigerant cooler and through the coolant cooler is interrupted.

* * * * *